April 21, 1970    A. GROSS ET AL    3,507,532

CLOSURE MEANS

Filed April 4, 1968

INVENTORS.
ARTHUR GROSS
PAUL C. KING

BY

ROY MILLER
ATTORNEY.

United States Patent Office 3,507,532
Patented Apr. 21, 1970

3,507,532
CLOSURE MEANS
Arthur Gross and Paul C. King, China Lake, Calif., assignors to the United States of America as represented by the Secretary of the Navy
Filed Apr. 4, 1968, Ser. No. 718,687
Int. Cl. B65d *45/30;* F16b *7/00;* F16l *37/22*
U.S. Cl. 292—256.6
3 Claims

ABSTRACT OF THE DISCLOSURE

A means for securing cylindrical closures by filling mating grooves or recesses of telescoping members with a plurality of segments of lockwire having substantially the same cross sectional area as that of the groove. This locking means provides high loading efficiency and is accomplished rapidly and easily.

BACKGROUND OF THE INVENTION

The invention pertains to a means for securing a locking relationship between telescoping members.

The conventional continuous lockwire is known to the art and is well described in U.S. Patent 1,045,277 which issued to Girling on Nov. 26, 1912, and British Patent A.D. 1915, Sec. 9 No. 17,310 describes a cylindrical closure wherein ball-bearings are inserted into a closed groove. In closures using the continuous lockwire the wire is permanently deformed and is frequently exceedingly difficult to remove when necessary for disassembly or inspection. The ball-bearings form "footprints" at the point of contact along the wall of the groove or recess and provides less efficient loading. The present invention provides greater loading efficiency and is easily and rapidly installed and removed with the aid of a hand tool.

SUMMARY OF THE INVENTION

The present invention is for a method and means for securing cylindrical closures which comprises filling mating grooves or closed channels of telescoping members with a plurality of segments of lockwire. The segments have substantially the same cross sectional area as that of the closed channel formed by the matched grooves and are of lengths greater than the width of the segments to prevent jamming when they are fed into the closed channel.

DESCRIPTION OF THE INVENTION

Figure 1:
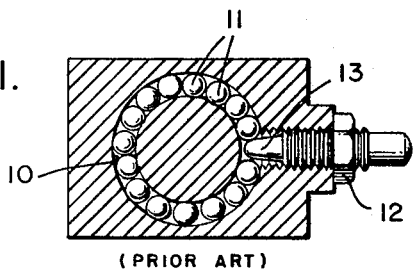
FIG. 1 is a cross section showing the prior art.
Figure 2:
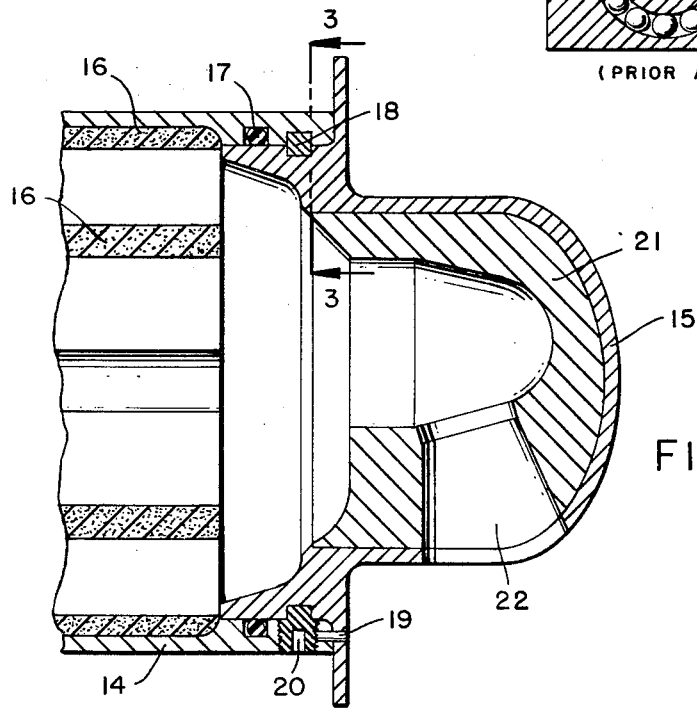
FIG. 2 is a section of an embodiment of the invention.
Figure 3:
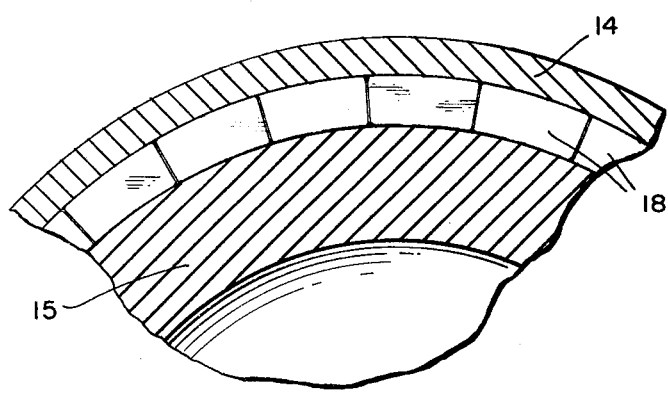
FIG. 3 is a section taken through lines 2—2 showing in detail the present invention.

Referring now to the drawing, FIG. 1 illustrates the prior art wherein there is shown groove 10 substantially filled with bearings 11 which were fed into groove 10 by means of an opening shown closed by screw pin 13. An embodiment of the present invention is shown in FIG. 2 wherein one end of a roll-type rocket motor is shown. The motor consists of the steel tube 14 which contains a new type propellant grain 16. Nozzle end cap 15 is shown located at the end of the motor tube 14. Cap 15 contains a graphite nozzle insert 21 with opposing angular nozzle 22 extending outside the airframe. End cap 15 is shown secured to motor tube 14 by lockwire segments 18 and is sealed by an O-ring 17. Segments 18 are inserted into the recess or mating groove formed when cap 15 is fitted onto motor tube 14 by way of an aperture shown closed by set screw 20. Roll pin 19 prevents rotation of end cap 15 which is secured to roll-type motor tube 14. In FIG. 3 it is shown that segments 18 are of the same cross sectional area as the groove or recess they occupy and are about twice as long as they are wide. The lengths of the segments should be about equal. If they are shorter in length than width, or the same dimension, the segments tend to turn and jam in the channel. It was found that a continuous length of wire fed into the groove or channel produced a great amount of friction, was permanently deformed, and exceedingly difficult to remove when necessary for disassembly or inspection. Likewise, the bearings were unsuitable. It took a minimum of two rows of bearings composed of the same material as the segmented wire to carry the same load. Thus, the segmented steel lockwire solved the loading problem and proved to be simple to install and remove. The lockwire used herein was of steel, but other materials may be used depending on the loading efficiency desired.

Obviously many modifications and variations of the present invention are possible in the light of the above teachings.

The invention described herein may be manufactured and used by or for the Government of the United States of America for governmental purposes without the payment of any royalties thereon or therefor.

What is claimed is:

1. A method for securing a cylindrical closure which comprises
   providing two members having mating grooves;
   fitting said members together so that said grooves form a closed channel;
   providing an aperture into said channel having the dimensions of said channel;
   inserting through said aperture a plurality of elongated lockwire segments until the channel is filled; all of said segments being about equal in size, each having a cross sectional area substantially equal to that of said channel, and each being about twice as long as it is wide; and
   closing said aperture.

2. A connection for providing a locking relationship between cylindrical telescoping members comprising
   a first cylindrical member having an inner cylindrical surface with an annular groove therein and a peripheral opening leading into said groove, said opening being as wide as said groove;
   a second cylindrical member having an inner clindrical surface with an annular groove in the periphery thereof and adapted to mate with the annular groove of said first member thereby forming a closed channel provided with said opening;
   a plurality of lockwire segments mounted through said opening in abutting relation to each other and substantially filling said channel;
   said segments having a cross sectional area substantially equal to the cross sectional area of said channel; each of said segments being about equal in size and each about twice as long as it is wide; and
   a set screw fitted into said opening.

3. In a cylindrical connection comprising in combination a cylindrical member and a cylindrical cap provided with an external annular ridge forming an interior annular channel, said ridge having an opening the size of the cross section of said interior channel and a plurality of segments of lockwire positioned through and extending from said opening so as to be in abutting relation to each and substantially filling said channel; said segments consisting of steel wire having about the same cross sectional area as that of said channel and each being of a length about twice its width thereby preventing turning and jamming of said segments in the channel.

References Cited

UNITED STATES PATENTS

| | | | |
|---|---|---|---|
| 1,908,844 | 5/1933 | Holtson | 285—276 |
| 2,458,714 | 1/1949 | Mahoney | 285—97.3 |
| 2,822,109 | 2/1958 | Tangard | 220—46 |
| 3,181,897 | 5/1965 | Krayenbuhl | 285—305 X |

FOREIGN PATENTS 853,093  11/1960  Great Britain.

MARVIN A. CHAMPION, Primary Examiner

E. J. McCARTHY, Assistant Examiner

U.S. Cl. X.R.

285—305; 287—1